United States Patent [19]

Betterton et al.

[11] Patent Number: 4,842,425
[45] Date of Patent: Jun. 27, 1989

[54] ODOMETER SHAFT RETAINER AND SUPPORT

[75] Inventors: Joseph T. Betterton, Arab; Alfred H. Glover, Decatur; Bruce Hepler, Huntsville, all of Ala.

[73] Assignee: Chrysler Motors Corporation, Highland Park, Mich.

[21] Appl. No.: 182,677

[22] Filed: Apr. 18, 1988

[51] Int. Cl.[4] .................. F16C 35/02; B65H 54/553; F16L 3/08; G01C 22/00
[52] U.S. Cl. .................. 384/440; 235/95 R; 242/129.6; 248/222.1; 384/416; 384/428
[58] Field of Search ............. 384/91, 125, 129, 215, 384/295, 416–419, 428, 434–436, 439–444; 428/222.1, 221.3; 403/26; 242/55.2, 68, 129.6; 235/95 R

[56] References Cited

U.S. PATENT DOCUMENTS

| | | | |
|---|---|---|---|
| 2,745,199 | 5/1956 | Kreinberg | 384/418 X |
| 3,042,461 | 7/1962 | Smith | 384/440 |
| 3,333,905 | 8/1967 | Hennequin | 384/440 |
| 3,337,129 | 8/1967 | Johnson | 235/95 R X |
| 3,355,702 | 11/1967 | Mundschenk et al. | 248/221.3 X |
| 3,451,733 | 6/1969 | Scott, Jr. et al. | 384/440 |
| 3,563,615 | 2/1971 | Dobelin | 384/440 |
| 3,994,542 | 11/1976 | Wojdyla | 384/440 |
| 4,354,097 | 10/1982 | Menager | 235/96 |
| 4,527,913 | 7/1985 | Seifert | 384/440 X |

Primary Examiner—Thomas R. Hannon
Attorney, Agent, or Firm—Kenneth H. MacLean, Jr.

[57] ABSTRACT

A support and retainer for a shaft to be supported in spaced overlying relation to a base member as found in an odometer assembly, including an upstanding projection or post which has a bearing portion for support purposes and further including an adjacent retainer member which extends generally parallel to the post and has a free end normally overlying the shaft end but movable in the shaft's axial direction to allow passage of the shaft end against the post's bearing.

4 Claims, 2 Drawing Sheets

4,842,425

ODOMETER SHAFT RETAINER AND SUPPORT

BACKGROUND OF THE INVENTION

The subject application concerns a shaft support and retainer for assembly of a shaft to a base such as the frame of an odometer assembly commonally used in automobiles. The ends of a shaft are moved in the shaft's radial direction and made to rest against a rigid support post or the like which projects from the base. The shaft end is secured against the post by means of a distinct retainer member with a portion which overlies the shaft end. The retainer is positioned adjacent the support post and in line with the shaft end. It is constructed and configured to be flexible in the axial direction of the shaft so that it may flex sufficiently as the shaft is installed against the post to permit passage of the shaft end thereby. Subsequent to engagement of the shaft end with the post, the retainer returns to a rest position with a portion overlying the shaft end.

In the manufacture of odometers, for example, it is usual to mount a shaft above or spaced from a support base or frame. It is desirable to install a shaft by a simple insertive motion or movement preferably in the axial direction of the shaft. This also permits the shaft to be easily detached in the event that replacement is desired. In U.S. Pat. No. 3,994,542, a shaft is supported through an opening in a bearing member itself attached by legs to a base or frame. The shaft itself is not directly attached to the base. Likewise, U.S. Pat. No. 3,451,773 discloses a shaft supported through a member by axially directed insertion into an opening. The shaft is retained therein by engagement of a radially extending formation of the shaft with a flexible keeper supported by the base member.

As previously mentioned, it is usually desired to mount a shaft to a base by simple radially directed movement of the shaft toward the base or frame. U.S. Pat. Nos. 3,333,905 and 4,354,097 disclose instruments in which a shaft is so mounted. Both patents provide a semi-circular bearing aperture in a side wall for reception of the shaft end. the semi-circular aperture extends greater than 180 degrees or in other words defines a slightly narrow opening or entrance less than the diameter of the semi-circle. An insertion force is thus needed to cause the shaft end to pass through the narrowed entrance and into the bearing portion. Consequently, during assembly, portions of the support are distorted. Likewise, the arrangement shown in U.S. Pat. No. 3,563,615 discloses a shaft end which is supported for rotation within an opening in a support walls. The wall has a circular bearing portion in which the odometer shaft is inserted in a radial direction relative to the shaft. The wall includes a resilient arm portion capable of movement under stress to allow the shaft end to pass into the bearing portion. Thereafter, the resilient arm returns to its unstressed position to prevent unintended disassembly of the shaft from the support.

It can be understood that the shaft supports discussed heretofore either requires an undesirable axially directed insertion of the shaft into an aperture or complex configurations formed in the support to permit entry of the shaft end into the bearing portion.

SUMMARY OF THE INVENTION

From the previous discussion, it can be readily understood that an object of the invention is this application is to provide an improved support for the end of a shaft consisting of a support post with a semi-circular bearing for the shaft and an adjacent separate retainer member which is engaged by the radial installation movement of the shaft end so that it is flexed in the shaft's axial direction to make way for the shaft end but subsequently returns to an unstressed position with a portion thereof overlying the shaft to thereby retain it in the bearing portion of the support post.

Another object of the invention is to provide a shaft supporting arrangement and device particularly adapted for insertive assembly of the shaft in a radial direction as defined by the shaft including separate support and retainer portions, the retainer portion serving to hold the shaft against a semi-circular bearing of the support portion.

Thus in accordance with these aspects of the invention, a base or frame has a support post projecting therefrom with a semi-circular bearing portion thereon against which the shaft rests for rotation. Also, the base has an adjacent but separate retainer arm or member projecting therefrom and constructed to be flexible in an axial direction of the shaft to be moved by the shaft end as the shaft moves toward the bearing portion. Once the shaft is resting against the support post, the retainer springs back over the shaft end to retain it.

A particular advantage of this support and retainer assembly is the ability to install the shaft by a simple radial insertion facilitated by separate flexing of a resilient retainer. The retainer has an inclined surface thereon so that the shaft's movement against the retainer causes the desired flexing of the retainer. Another advantage of the support and retainer is the relative ease of mold forming the separate support and retainer portions. This permits the support post with its bearing portion to be relatively rigid the retainer to be configured to be readily flexed in a desirable manner.

Further objects and advantageous features of the invention are set forth in the appended claims. The invention will be best understood from the following detailed description of a specific embodiment when read in connection with the accompanying drawings.

DESCRIPTION OF A PREFERRED EMBODIMENT

Figure 1:
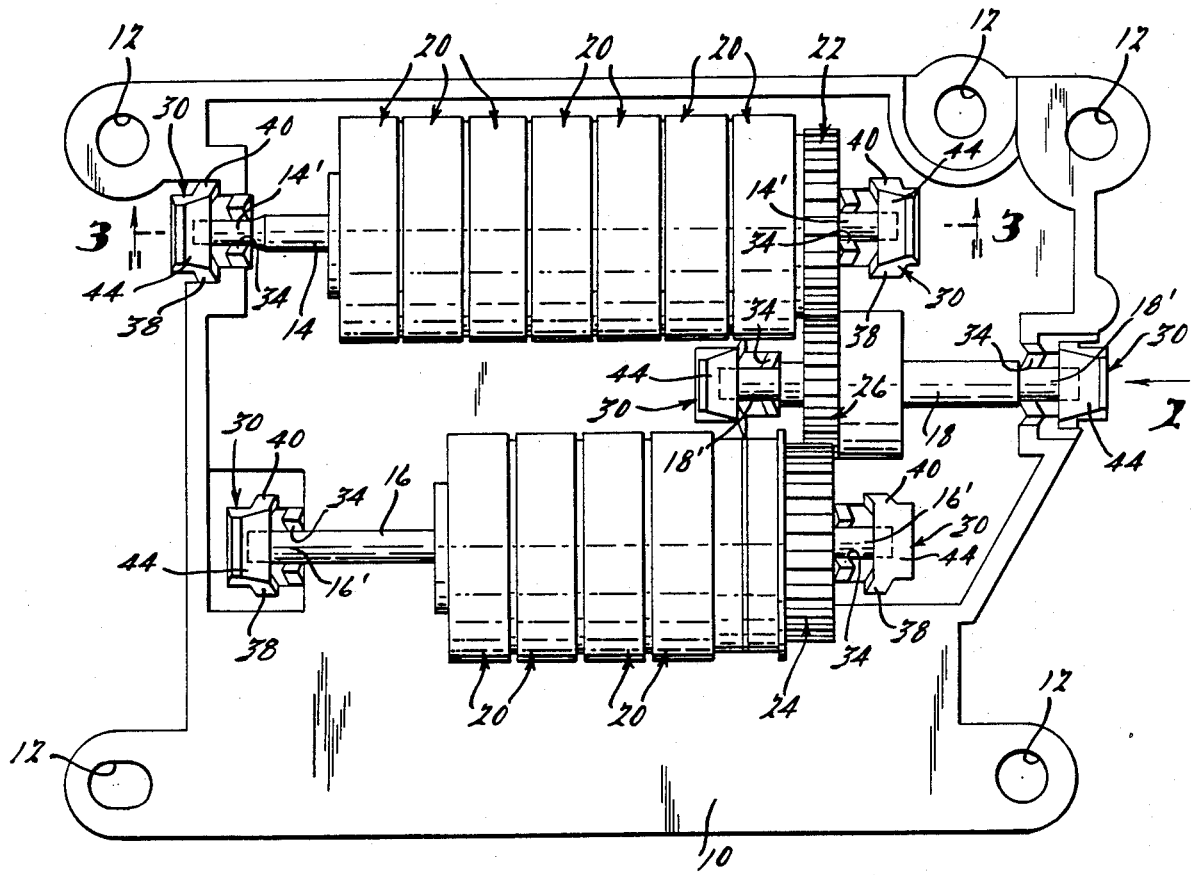
FIG. 1 is an elevational view of an odometer mechanism.
Figure 2:
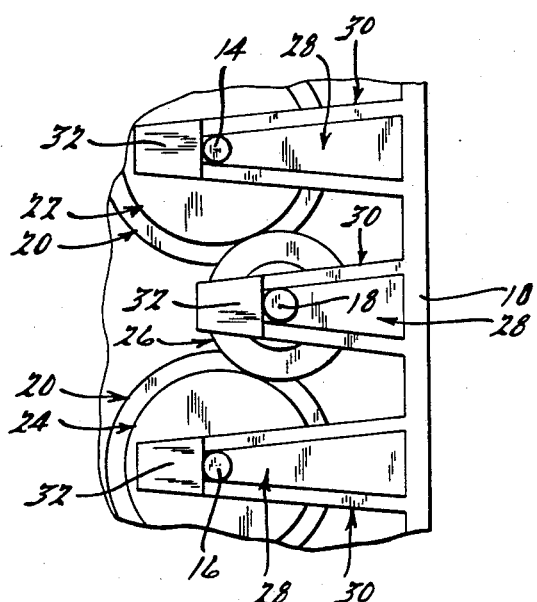
FIG. 2 is a fragmentary end view of the odometer mechanism shown in FIG. 1 taken in the direction of the arrow 2 in FIG. 1.

Referring now to the preferred embodiment shown in the drawings and particularly in FIGS. 1 and 2, a base or frame member 10 has several openings 12 used for receiving fasteners or the like (not shown) for the mounting of the odometer to a vehicle structure. The base 10 supports an odometer mechanism including odometer shafts 14 and 16 and an odometer drive or input shaft 18. Specifically, shaft 14 is for the purpose of total mileage indication. For this purpose, the shaft 14 supports multiple mileage recording or counting wheels 20 for rotation thereof in a manner well known in the art. Also in a well known manner, the wheels 20 are provided with digits 0-9 imprinted about their circumference.

The shaft 16, like shaft 14, also supports a multitude of mileage recording wheels 20 for the purpose of recording and indicating mileage during a specific trip or the like. Both the total mileage and the trip mileage mechanisms include toothed drive gears 22 and 24 respectively which are engaged by a similarly toothed input drive gear 26 which is mounted on the third shaft 18. The shaft 18 also receives a rotative input from the drive mechanism (transmission usually) of the associated vehicle so as to rotate the odometer in correspondence to movement of the vehicle.

Accordingly, the rotation of shaft 18 and thereby the associated gears 26, 22 and 24 in turn produce sequential rotation of the wheels 20 in a well known manner in the odometer art. Resultantly, the numerals imprinted on the wheels are moved so as to be visible through windows (not shown) in the associated instrument panel.

Figure 5:
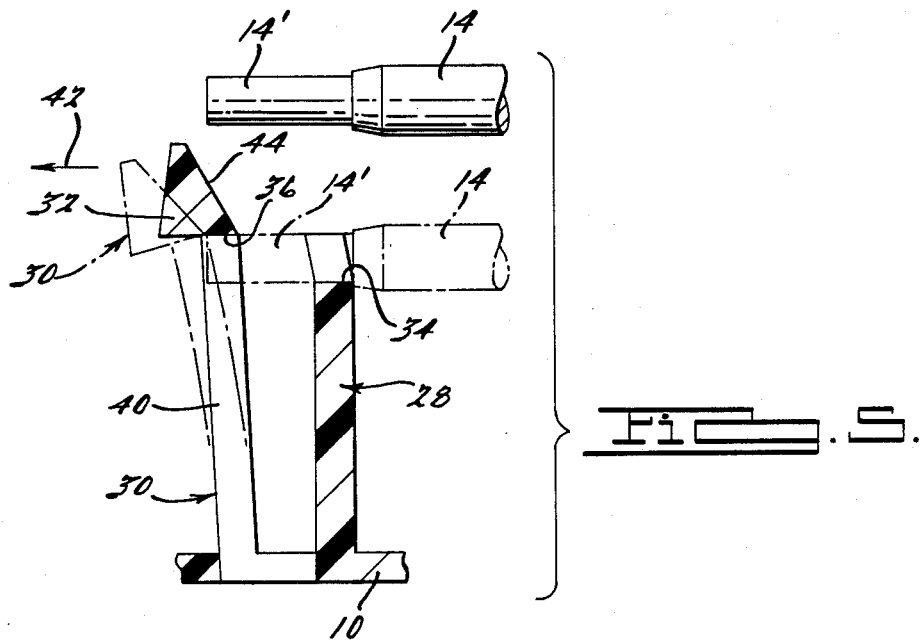
FIG. 5 is an enlarged view of the support and retainer shown in FIG. 3 revealing the desired movement of the retainer in the axial direction of the shaft as the shaft is installed against the support.

It is desirable to assemble or install the shafts 14, 16 and 18 by moving them in the radial direction of the shaft toward the base 10 as best shown in FIG. 5. An end view of the shafts 14, 16 and 18 is illustrated in FIG. 2 which shows the installed position relative to the base 10. When in the installed position, the shafts are supported against support posts 28 which project away from the base or frame 10. The shafts are retained in the installed position against the posts 28 by a retaining member 30 and specifically by an overlying end portion 32 of retainer 30.

Figure 3:
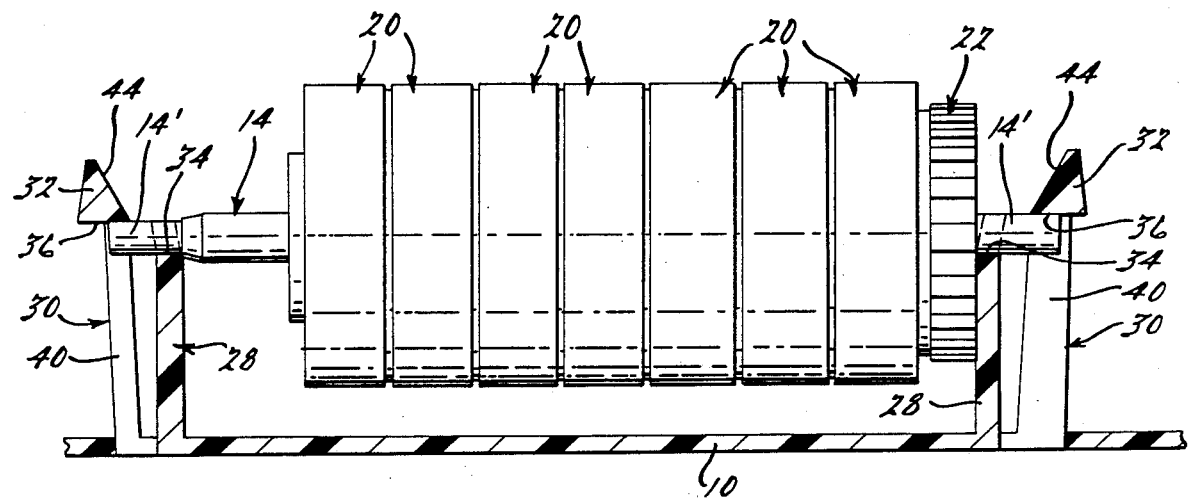
FIG. 3 is an enlarged sectioned view of the odometer mechanism taken along section line 3—3 in FIG. 1 and looking in the direction of the arrows.
Figure 4:
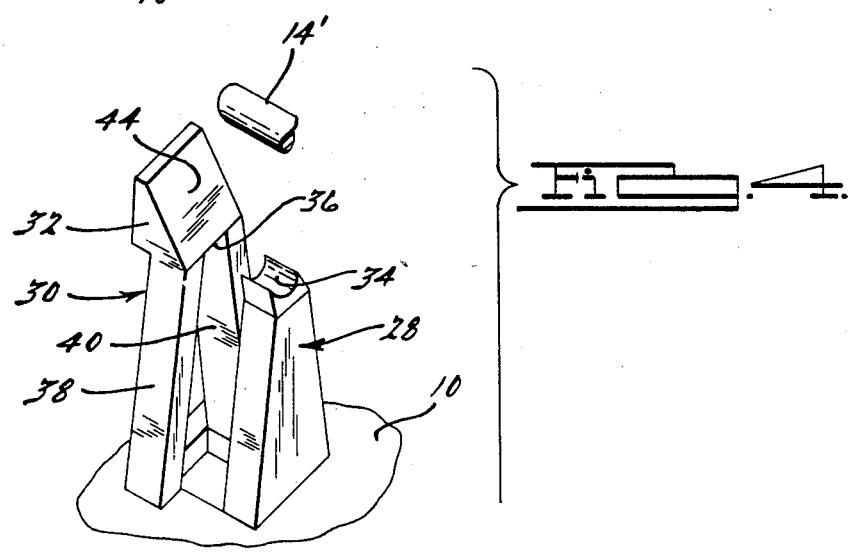
FIG. 4 is an enlarged perspective view of the shaft support and retainer of the odometer shown in FIG. 3 prior to installation of the shaft.

Reference is made to FIGS. 3-5 to best illustrate the structure of the odometer permitting the desired installation of the shafts. In FIG. 3, each end 14' of shaft 14 is shown in its support position against a semi-circular bearing surface 34 which is formed at the outer end of the support post 28. The end portion 14' is retained toward bearing portion 34 by the overlying end portion 32 of the retainer 30. Specifically, an inward facing surface 36 of end portion 32 actually engages the shaft end 14. As revealed in FIG. 4, the end portion 32 is supported and integrally connected to a pair of leg portions 38 and 40 which are attached to the base or frame 10. The legs 38 and 40 are space from one another to form a clearance for the passage of shaft end 14' when installed against post 28.

The separated thin leg portions 38, 40 are designed to provide a sufficient flexibility to the retainer 30 so that the end portion 32 can be readily moved in the shaft's axial direction during installation. This installation flexure is best shown in FIG. 5 where the stressed positioning of retainer 30 in direction 42 is shown by broken lines. The aforedescribed installation flexure is automatically caused by the inward radial movement of end portion 14' toward the bearing portion 34 of support post 28. Specifically, the end portion 14' of the shaft engages an inclined surface 44 on the end portion 32 during installation. Accordingly, as the shaft 14 descends toward the bearing 34, the flexible retainer 30 first is distorted to the left as shown in FIG. 5. This allows the end portion 14' to move toward the post 28 and into engagement with the bearing portion 34. When the shaft end 14' fully engages bearing 34, the end of the shaft passes by the surface 44 and thus distorting force on retainer member 32 in direction 42 is terminated. Resultantly, the retainer 30 returns to an unstressed position and portion 32 thereof moves into overlying relation to the end portion 14', thus retaining the shaft against the support post.

As is clear from the aforedescribed description, solid support for the shaft is provided on the relatively rigid support posts. Also, the shaft retainers readily allow both easy installation and disassembly of the shaft. The installation of the shaft automatically produces retainer flexure as the shaft is moved into its final position. After installation, the force producing flex of the retainer is relieved. Resultantly, the retainer 32 is free to return to its unstressed condition in overlying engagement with the shaft.

Although only a single embodiment of the shaft support and retaining mechanism has been shown and described in detail, it should be clear that modifications may be made to the embodiment that still fall within the scope of the appended claims which describe the scope of the invention.

What is claimed is as follows:

1. In a device including a base member with at least one shaft supported in spaced relation thereto, an improved shaft support and retainer mechanism to allow installation of the shaft by simple movement thereof in the shaft's radial direction toward the base member, comprising: a support post projecting from the base member having a bearing configuration at its outward end against which the shaft is adapted to rest; a separate retainer member projecting from the base member adjacent to and along side of the support post, the retainer member configured with an aperture therethrough in the direction of the axis of the shaft, this aperture being formed by spaced side legs and an end portion configured and positioned so that the shaft extends through the aperture when in its installed position and whereby the end portion of the retainer overlies the shaft to prevent radial movement of the shaft away from the support post; the legs of the retainer being constructed so a relatively low force in the shaft's axial direction flexes the retainer to move its end portion so that the end of the shaft may pass thereby and into engagement with the support post whereafter the retainer returns to its unstressed condition with the end portion overlying the shaft.

2. In an odometer assembly including a base member and at least one shaft supported in spaced relation thereto, an improved shaft support and retainer mechanism to allow installation of the shaft to the base by simple movement of the shaft in its radial direction toward the base member, comprising: a support post projecting from the base member having a bearing configuration at its outward end against which the shaft is adapted to rest when in the installed position; a separate retainer member projecting from the base member adjacent to and along side the support post, the retainer member configured with an aperture therethrough in the direction of the axis of the shaft, this aperture being defined by spaced side legs and an end portion configured and positioned so that the shaft extends therethrough in the direction of the axis of the shaft when in the installed position and whereby the end portion of the retainer overlies the shaft to prevent radial movement of the shaft away from the support post; the legs of the retainer being constructed so that a relatively low force in the shaft's axial direction will flex the retainer to move its end portion so that the shaft end may pass thereby and into engagement with the support post whereafter the retainer returns to its unstressed condition with its end portion overlying the shaft; an inclined surface formed on the end portion of the retainer positioned to interact with the end of the shaft so that the aforesaid flexing is automatically produced by movement of the shaft in its radial direction toward the bearing portion of the support post.

3. The device set forth in claims 1 or 2 in which the retainer is configured with two spaced legs extending from the base member into integral attachment with the end portion, the legs extending in non-parallel relation to each other and converging toward one another, the end portion defining an inwardly facing surface located between the juncture of the legs which surface engages the shaft to secure it against the support post.

4. The device set forth in claim 2 in which the angle of the inclined surface is sufficiently offset from the shaft end so that the end portion is moved enough so that the shaft may pass by the end portion.

* * * * *